US006587635B1

(12) United States Patent
Subramanian et al.

(10) Patent No.: US 6,587,635 B1
(45) Date of Patent: Jul. 1, 2003

(54) SUBPICTURE MASTER CONTROL

(75) Inventors: Pattabiraman Subramanian, Santa Clara, CA (US); Ibrahim Cem Duruoz, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/280,101

(22) Filed: Mar. 29, 1999

(51) Int. Cl.$^7$ .......................... H04N 5/781; H04N 5/783
(52) U.S. Cl. ............................. 386/68; 386/95; 386/98
(58) Field of Search ...................... 386/6–8, 33, 68–70, 386/81–82, 95, 98, 104–106, 111–112, 125–126; 348/423.1; H04N 5/76, 5/91, 5/92, 5/781, 5/783

(56) References Cited

U.S. PATENT DOCUMENTS

| | | | | |
|---|---|---|---|---|
| 5,928,321 A | * | 7/1999 | Ozcelik et al. | 709/1 |
| 5,959,684 A | * | 9/1999 | Tan et al. | 348/515 |
| 6,012,137 A | * | 1/2000 | Bublil et al. | 712/36 |
| 6,115,077 A | * | 9/2000 | Tsukagoshi | 348/607 |
| 6,363,207 B1 | * | 3/2002 | Duruoz et al. | 386/68 |
| 6,424,792 B1 | * | 7/2002 | Tsukagoshi et al. | 386/95 |
| 6,512,552 B1 | * | 1/2003 | Subramania | 386/95 |

* cited by examiner

Primary Examiner—Thai Tran
(74) Attorney, Agent, or Firm—Wood, Herron & Evans, L.L.P.

(57) ABSTRACT

A method for operating a digital video processor including a CPU and a memory to control the presentation of demultiplexed subpicture unit ("SPU") data. The play back of the subpicture is synchronized with a system clock having a clock rate varying as a function of a desired play back speed selected by a user. The method first tests during a vertical blanking period, consecutive ones of the SPU's to identify a first SPU including a PTS value having a desired relationship with respect to a value of the system clock. Next, the video processor tests during the vertical blanking period, consecutive ones of the DCSQ commands in the first SPU to identify one or more DCSQ commands with a start time value having a desired relationship with respect to the value of the system clock. Thereafter, the one or more of the DCSQ commands associated with the first SPU are parsed, and subpicture data associated with one of the parsed DCSQ commands is displayed.

18 Claims, 4 Drawing Sheets

SUBPICTURE MASTER CONTROL

BACKGROUND OF THE INVENTION

This invention relates to the digital processing of video data to be displayed on a television screen and more particularly, to the processing of subpicture data.

Almost all televisions manufactured today are capable of interfacing with different sources of program materials, for example, a VCR, a digital versatile disk ("DVD") player, cable, DSS, etc., that provide audio signals for creating sounds and associated video input signals for creating screen displays. Some of those sources provide digital audio and video input signals in accordance with the Moving Picture Expert Group MPEG-2 audio/video digital compression standard. Further, most televisions and/or their plug compatible program sources have user interactive capabilities with which a user may choose to have the programmed source provide a subpicture display of captions, subtitles, karaoke or simple animation on the screen along with the program material. Thus, contemporary televisions and/or DVD systems preferably have the capability of processing compressed digital input signals representing audio, video and subpicture and providing digital output signals representing the desired sound, video and subpicture images. Most often, those digital output signals are converted to analog signals for use by known analog television display units.

The implementation of digital signal processing for providing a video and subpicture display and associated audio from an audio-video source of programmed material presents numerous design challenges that were not encountered in the prior processing of analog audio and video signals. For example, with digital signal processing, the audio signals and the main and subpicture signals are separated and are processed independently. However, the playback of the audio, video and subpicture must be synchronized, so that there is a coordinated and coherent reproduction of the desired audio, video and subpicture provided from the source of program material.

The source, for example, a DVD, preferably provides the audio and video data in respective data packets in an "MPEG-2" format. Each of the audio, video and subpicture data packets is received from the source of video material in a continuous data stream. Each packet of video data includes a header block followed by a data block. The data block may include any number, for example one to twenty, of frames of video data that may include a full field of video data or be a coded group of pictures that includes its own header block identifying the picture type and display order. The header block for a video data packet includes control information, for example, the identity of the format of the video data, the type of compression, if used, picture size, display order, and other global parameters.

The audio data packet has a header block that again identifies the format of the audio data with instructions relating to how the audio data is to be decoded and processed to provide desired enhancements, if applicable. Following the header block, the audio data packet includes an audio data block that has any number of blocks or frames of audio data, for example, from one to approximately twenty blocks.

The subpicture data may be provided in a data packet in one of several formats. For purposes of this description, it will be assumed that the subpicture data is being provided in a Subpicture format that is defined by the known DVD standard. The Subpicture format includes a header block, a pixel data block, and a display control sequence ("DCSQ") command data block. Generally, the header is used to identify the general nature of the data, for example, the size of the subpicture unit and the location of the DCSQ commands. In the Subpicture format, the pixel data represents color and contrast information and is compressed using known compression techniques, for example, run length compression. The DCSQ command block includes one or more sets of commands that determine color and contrast globally within the subpicture. In addition, DCSQ command data may optionally include a Change Color-Contrast ("CHG_COLCON") command which functions to change the color and contrast within the subpicture on a pixel by pixel basis.

Selected ones of the header blocks of the audio, video and subpicture data packets include a presentation time stamp ("PTS") value which is a time stamp that is applicable to the associated data. The PTS value is a time reference to a system time clock that was running during the creation or recording of the audio and video data. A similar system time clock ("STC") is also running during the playback of the audio and video data, and if the audio, video and subpicture data are played back at the times represented by their presentation time stamps, the audio, video and subpicture data will be presented to the user in the desired synchronized manner. Therefore, the PTS value is used to synchronize the presentation or playback of the audio, video and subpicture data.

During the decoding of the audio data, it normally must be decompressed, reconstructed and enhanced in a manner consistent with the source of program material and the capabilities of the sound reproduction system. In some applications, audio data packets may contain up to six channels of raw audio data. Depending on the number of channels the sound reproduction systems can reproduce, for example, from two to six, the sound reproduction system selectively uses the channels of raw audio data to provide a number of channels of audio which are then stored in an audio FIFO.

The decoding of the video data normally requires decompression, conversion of partial frames into full frames and the recognition of full frames. The decoding of subpicture data requires the decompression of run length compressed bit maps of subpicture data. Simultaneously with the decoding process, audio, video and subpicture data is being played back to the user, and in that playback, the frames of audio and video data are being output and the subpicture is overlaid on top of the video and the reconstructed audio, video and subpicture must be synchronized in the playback process such that the audio, video and subpicture present a coordinated and coherent presentation.

As will be appreciated from the foregoing, demultiplexing the audio, video and subpicture data packets is a complex process of deconstructing the data packets and storing the necessary decoding instructions as well as the content data itself to permit the decoding and playback of the data in a synchronized manner. One such process, is described in a copending U.S. patent application Ser. No. 08/901,090 entitled Method and Apparatus for Audio-Video Synchronizing, filed on Jul. 28, 1997, and assigned to the assignee of the present application. U.S. patent application Ser. No. 08/901,090 is in its entirety hereby incorporated by reference.

The interactive nature of current entertainment equipment presents additional problems in a synchronized playback of audio, video and subpicture data. For example, subtitles in a language different from the language in the audio data are often displayed in the playback of programmed media, for example, a movie on a video disk. The user has the capability of interrupting the normal play mode of the video, for example, with a pause control, a fast forward control, or controls that allow the user to skip to another section of the video disk. Thus, the user can choose to display the video differently in terms of speed and sequence than the speed and sequence of the audio and video recorded on the video disk. However, with current systems, when the normal play mode of the video is interrupted or a playback at a different speed is initiated, the subpicture is interrupted and not displayed. Thus, whatever content and program value is in the subpicture is lost to the user.

Consequently, in a video system providing subpicture capability, there is a need to provide a method of processing the subpicture data in response to nonconsecutive selections of video such that the video and subpicture are played back to provide the desired program presentation.

SUMMARY OF THE INVENTION

The present invention provides a method and apparatus for improving the control of subpicture processing in association with the processing of the audio and video frames from a program source. The present invention has an advantage of being able to automatically playback subpicture video while the main video is being played at a nonnormal speed, for example, slow forward. During each vertical blanking period, the system first automatically selects the subpicture unit that corresponds with the current state of a system clock and thereafter automatically selects display control sequence ("DCSQ") command that also corresponds to the current state of the system time clock.

In accordance with the principles of the present invention and in accordance with the described embodiments, the present invention provides a method for operating a digital video processor including a CPU and a memory to control the presentation of demultiplexed subpicture unit ("SPU") data. The play back of the subpicture is synchronized with a system clock having a clock rate varying as a function of a desired play back speed selected by a user. The method first tests during a vertical blanking period, consecutive ones of the SPU's to identify a first SPU including a PTS value having a desired relationship with respect to a value of the system clock. Next, the video processor tests during the vertical blanking period, consecutive ones of the DCSQ commands in the first SPU to identify one or more DCSQ commands with a start time value having a desired relationship with respect to the value of the system clock. Thereafter, the one or more of the DCSQ commands are parsed, and subpicture data associated with one of those DCSQ commands is displayed.

These and other objects and advantages of the present invention will become more readily apparent during the following detailed description taken in conjunction with the drawings herein.

DETAILED DESCRIPTION OF THE INVENTION

Figure 1:
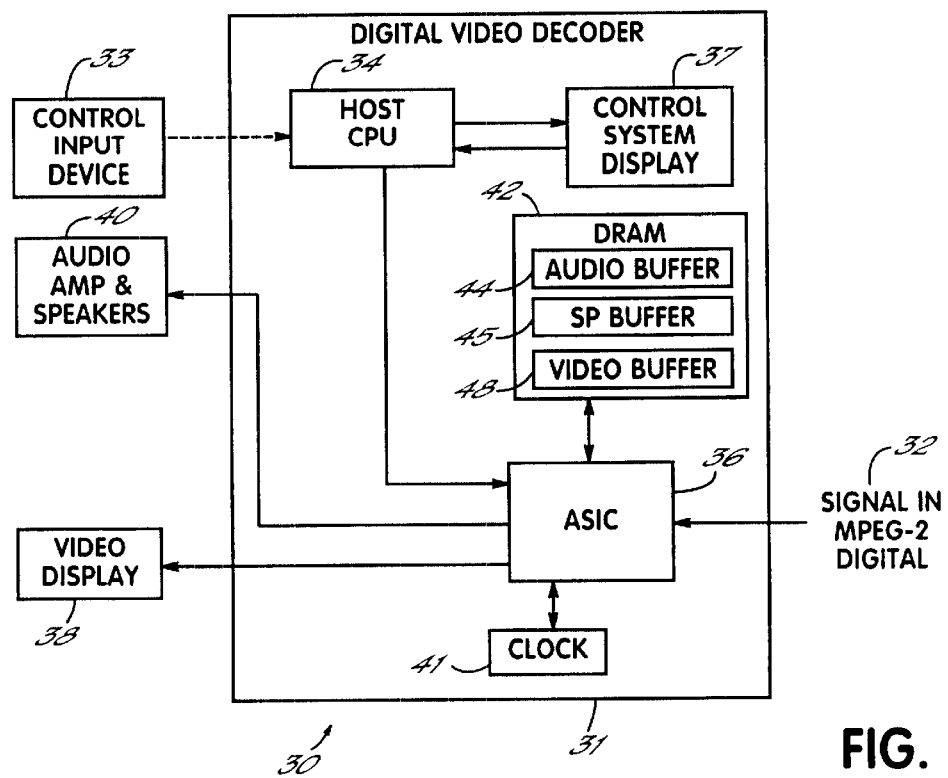
FIG. 1 is a schematic block diagram of a digital audio/video decoder in accordance with the principles of the present invention.

Referring to FIG. 1, one embodiment of the present invention is for use in a DVD audio/video decoder 30 which includes a unit processor 31 with a program signal input 32 from a DVD drive. A central processing unit or host CPU 34 which is programmed to process user commands from a control input device (not shown) operates a control system display which displays information, menu selections and other information to the user and which may or may not also function as an input device. An Application Specific Integrated Circuit ("ASIC") 36, when provided with configuration and selection information by the host CPU 34, decodes the raw signal from signal input 32 for output to the video and audio presentation devices 38 and 40, respectively. A local system clock 41 preferably is connected to the ASIC 36 and a buffer memory 42. The buffer memory 42 is an in-line, sequential memory, such as dynamic random access or DRAM memory.

Components of the ASIC 36 are further described in commonly-assigned, copending U.S. patent application Ser. No. 08/865,749, entitled "SPECIAL PURPOSE PROCESSOR FOR DIGITAL AUDIO/VIDEO DECODING", filed on May 30, 1997, and commonly-assigned, copending U.S. patent application Ser. No. 09/280,437 entitled "VARIABLE LENGTH DECODER FOR DECODING DIGITALLY ENCODED VIDEO SIGNALS", filed on even date herewith, which applications are hereby incorporated by reference herein in their entirety. A memory controller for use therewith is disclosed in commonly-assigned, copending U.S. patent application Ser. No. 08/846,590, entitled "MEMORY ADDRESS GENERATION FOR DIGITAL VIDEO", filed on Apr. 30, 1997, which is hereby incorporated by reference herein in its entirety. The above-referenced U.S. patent applications describe an application specific integrated circuit (ASIC) for performing digital video processing, which is controlled by a reduced instruction set CPU (RISC CPU). The RISC CPU controls computations and operations of other parts of the ASIC to provide digital video reception. Due to the limitations of the RISC CPU, a task and stack manager procedure is required to monitor task flags, prioritize task flags, manage subroutine calls (the hardware does not support nesting of subroutine calls), and provide virtual instruction memory management. A specific processor of this kind is disclosed in commonly-assigned, copending U.S. patent application Ser. No. 08/866,419, entitled "TASK AND STACK MANAGER FOR DIGITAL VIDEO DECODING", filed on May 30, 1997, which is hereby incorporated by reference herein in its entirety.

Figure 2:
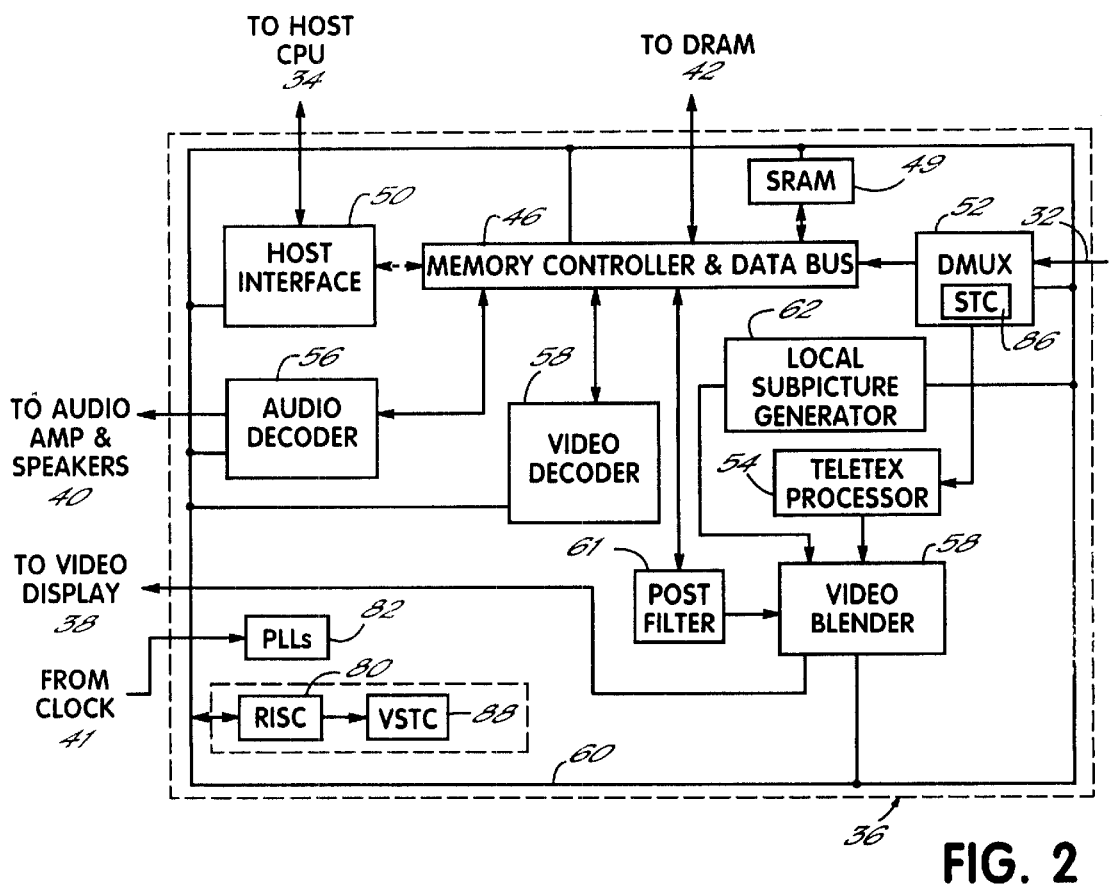
FIG. 2 is a schematic block diagram of an ASIC device within the digital audio/video decoder of FIG. 1.

Referring to FIG. 2, the ASIC 36 is a single integrated circuit chip that is logically divided into a number of components or functions. The ASIC 36 includes a memory controller and data bus 46, which provides a plurality of two-way data flow connections. One of the two-way connections is to a static random access memory ("SRAM") 49 of the ASIC 36. Another of the two-way connections is to a host interface unit 50 which connects externally with the host CPU 34, and another is to the DRAM memory module 42 which is external to the ASIC 36. The ASIC 36 includes a demultiplexer or DMUX 52 which has an input connected to the signal input 32 and an output delivering the received data to the bus 46. The DMUX 52 has a text output connected to a teletex processor 54, that is also provided on the ASIC 36 for processing collateral information such as closed caption script and other such data.

The ASIC 36 further includes an audio decoder 56, a video decoder 58 and a subpicture generating unit 62. The audio decoder 56 has an input side connected to the one of the two-way data connections of the bus 46 and an output connected to audio presentation subsystem 40. The video decoder 58 receives video data via the two-way data connections of the bus 46, decodes and otherwise processes the received video data, and sends the decoded and partially processed video picture data back through bus 46 to the DRAM memory 42. This processing preferably includes the application of motion compensation calculations and the construction of B-picture fields from buffered I and/or P frames and received B-picture data.

The subpicture generating unit 62 generates local picture information that includes control menus, display bar-graphs, captions, subtitles, karaoke or simple animation and other indicia used in interaction with the user. Normally, during the decoding process, video data is supplied from DRAM 42 to a video blender 58. The video blender 58 combines the program or main video with local video from the subpicture unit 62 and/or with teletex information from the teletex processor 54. The output of the blender 58 is connected to the video presentation subsystem 38.

The ASIC 36 is provided with a control bus (not shown) which is connected to the components in the ASIC 36. The ASIC 36 is also provided with a Reduced Instruction Set Controller ("RISC") 80, which serves as the local CPU of the ASIC 36. The RISC 80 controls the functions of the components of the ASIC 36 through control data ports connected to the control bus. The RISC 80 has a clock input that connects externally of the ASIC 36 to the system clock 41, and has phase locked loop circuitry ("PLL") 82 within the ASIC 36 used to time internal clock signals.

Audio, video and subpicture data packets are received and demultiplexed continuously in independent parallel data streams. The decoding and playback of output frames of audio, video and subpicture data is also performed continuously in parallel data streams independent of the demultiplexing processes. Demultiplexing is a process that varies significantly in real time, depending on the nature of audio, video and subpicture data being received. In addition, the number of video frames to be presented and their order of presentation cannot be determined from the raw video data being received. The creation of video frames and their order of presentation is a function of the decoding process and is determined primarily by the control data in the header portion of the video data packet. Similarly, the raw audio data being received in the data packet bears little resemblance to the audio data output and presented, and the frames of audio data to be presented are created during the decoding process of the audio data. The subpicture data is received in a series of one or more data packets that include display control sequence ("DCSQ") commands each of which has its own start time ("STM") value. A subpicture unit ("SPU") is defined by the subpicture data occurring between subpicture data packets having a presentation time stamp ("PTS") value. The intermediate subpicture data packets contain additional DCSQ command data.

Figure 3:
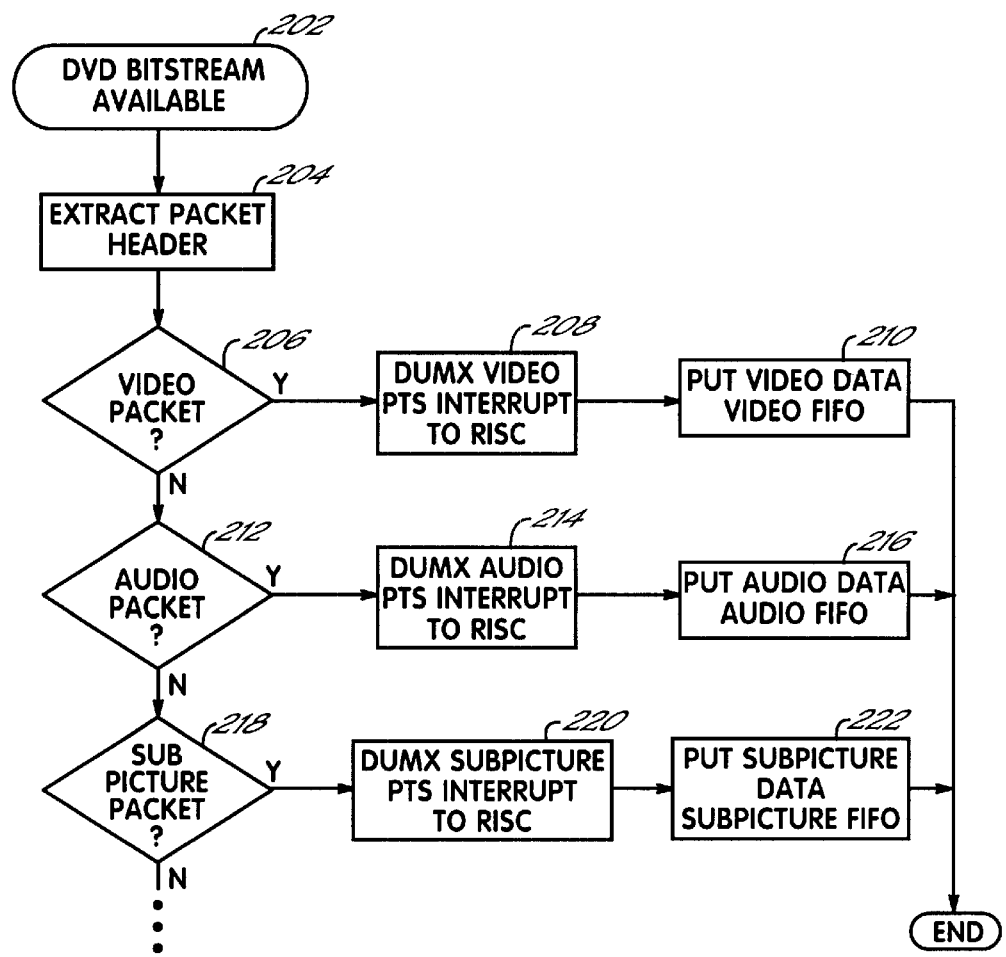
FIG. 3 is a flow chart illustrating the steps of a portion of the demultiplexing process executed by the demultiplexer in accordance with the principles of the present invention.

FIG. 3 is a flow chart illustrating the general operation of the DMUX 52 of FIG. 2. At 202, the input 32 to the DMUX 52 continuously receives a bit stream of data on input 32 containing in random order, audio, video and subpicture data packets. The header block of data is extracted at 204, and video data packets are identified at 206. A video demultiplexing interrupt is provided at 208 to the RISC 80 (FIG. 2); and at 210, the video data is sequentially stored in preferably a contiguous variable length video data buffer, for example, a video first-in, first-out ("FIFO"), 43 in memory 42 for use by the ASIC 36 during the video signal processing. In a similar process, audio data packets are identified at 212, and an audio demultiplexing interrupt is provided at 214 to the RISC 80. At 216, the audio data is sequentially stored in an audio data buffer, for example, an audio FIFO, 44 in memory 42 (FIG. 1). Subpicture data packets are identified at 218, and a subpicture demultiplexing interrupt is provided at 220 to the RISC 80. At 222, the subpicture data is sequentially stored in a subpicture data buffer, for example, a subpicture FIFO, 45 in memory 42.

The demultiplexing process with respect to the audio, video and subpicture data continues in a manner described in detail in the previously cited pending U.S. patent application Ser. No. 08/901,090 entitled Method and Apparatus for Audio-Video Synchronizing. As described therein, the DMUX continuously provides audio, video and subpicture PTS interrupts to the RISC 80. While the process of demultiplexing the audio, video and subpicture data continues, a process of decoding and playing back the audio, video and subpicture frames is also running. In this process, there are several different modes of operation by which the audio, video and subpicture data are synchronized. For purposes of the subpicture control, the audio data is selected as the master and the video and subpicture frames are synchronized thereto. The general process of synchronization and the different synchronizing modes is explained in detail in the previously cited U.S. patent application Ser. No. 08/901,090 entitled Method and Apparatus for Audio-Video Synchronizing. The selection of the correct subpicture data to be displayed is performed during the vertical blanking time.

It should be noted that output audio frames can be of any length in real time, and further, several audio frames may be associated with single video frame, or in contrast, a single audio frame may be presented during video produced by several video frames.. However, it is required that the frames of audio and video be played back in a synchronized manner to provide a coordinated and coherent presentation to the user. To facilitate the coordination of the presentation of the frames of audio and video data, selected ones of the audio and video data packets contain a PTS value, which is a time reference to a system counter that was running during the creation or recording of the audio and video data. A similar system time clock ("STC") is maintained and clocked in real time, for example, in register 86, by the DMUX 52; and during the demultiplexing process, audio, video and subpicture PTS values are stored in respective PTS tables. During the standard decoding and playback, the audio and video PTS values in the tables are compared to the STC times; and when a PTS value is equal to or less than the STC time, the respective audio, video and subpicture data is read from memory, decoded and played at a time and in a sequence that conforms to the how the data was recorded on the DVD.

With respect to the subpicture, the RISC 80 decodes the DCSQ commands in the subpicture during the vertical blanking period, that is, with each vertical sync period ("fid"). Upon determining the appropriate DCSQ command to be executed, the RISC 80 provides first command data, for example, subpicture location data and color and contrast data to the subpicture generator 62 and further causes subpicture pixel data and other subpicture command data, for example, a Change Color-Contrast ("CHG_COLCON") command to be provided to the subpicture generator 62 from memory 42. The RISC 80 also causes the pixel data for the video to be sequentially provided from the memory 42 to the video blender 58. Simultaneously therewith, the subpicture generator 62 provides, if appropriate, subpicture pixel data to the video blender 58. The video blender 58 utilizes a known process, for example, a mixing process, to mix the subpicture pixels with the video pixels from memory 42 and produce the desired mixed or blended video data. The blended video data is then encoded in accordance with a desired standard, for example, a NTSC or PAL standard; and thereafter, the encoded video data is converted to an analog signal and displayed on a display unit 38.

The above described system works well with standard playback commands; however, difficulties can arise during trick play situations, that is, when the user commands a pause, a slow forward play, etc. In each of those situations, the rate at which the audio, video and subpicture is played back must be adjusted with respect to the standard play back situation. With the standard play back, the STC is used to synchronize the playback of audio, video and subpicture. However, the STC is provided by the DMUX 52 and is not adjustable. Therefore, with the present invention, the ASIC 36 maintains a second, virtual system time clock ("VSTC"), for example, in a store 88. Thus, in certain complex playback modes, the playback of the audio and video may be uncoupled, that is, the playback of the audio is controlled by the time values in the STC 86 and the playback of the video is controlled by the time values in the VSTC 88. The VSTC 88 is illustrated as being stored in the RISC 80, however, as will be appreciated, the VSTC maintained by the RISC 80 may be stored in other memory locations, for example, in the DRAM 42. In the standard playback mode, the value in the VSTC 88 is updated with the current time value in the STC 86 with each video frame decoded and output by the RISC 80. Thus, the VSTC time is maintained in synchronization with the STC time. However, when the user instructs a trick play mode, the playback of video data is controlled by the VSTC 88 and not the STC 86. The operation of the VSTC is described in more detail in a commonly assigned copending U.S. patent application Ser. No. 09/177,261, filed Oct. 22, 1998 for Method and Apparatus for a Virtual System Time Clock for Digital Audio\Video Process which is hereby incorporated by reference herein in its entirety.

Figure 4:
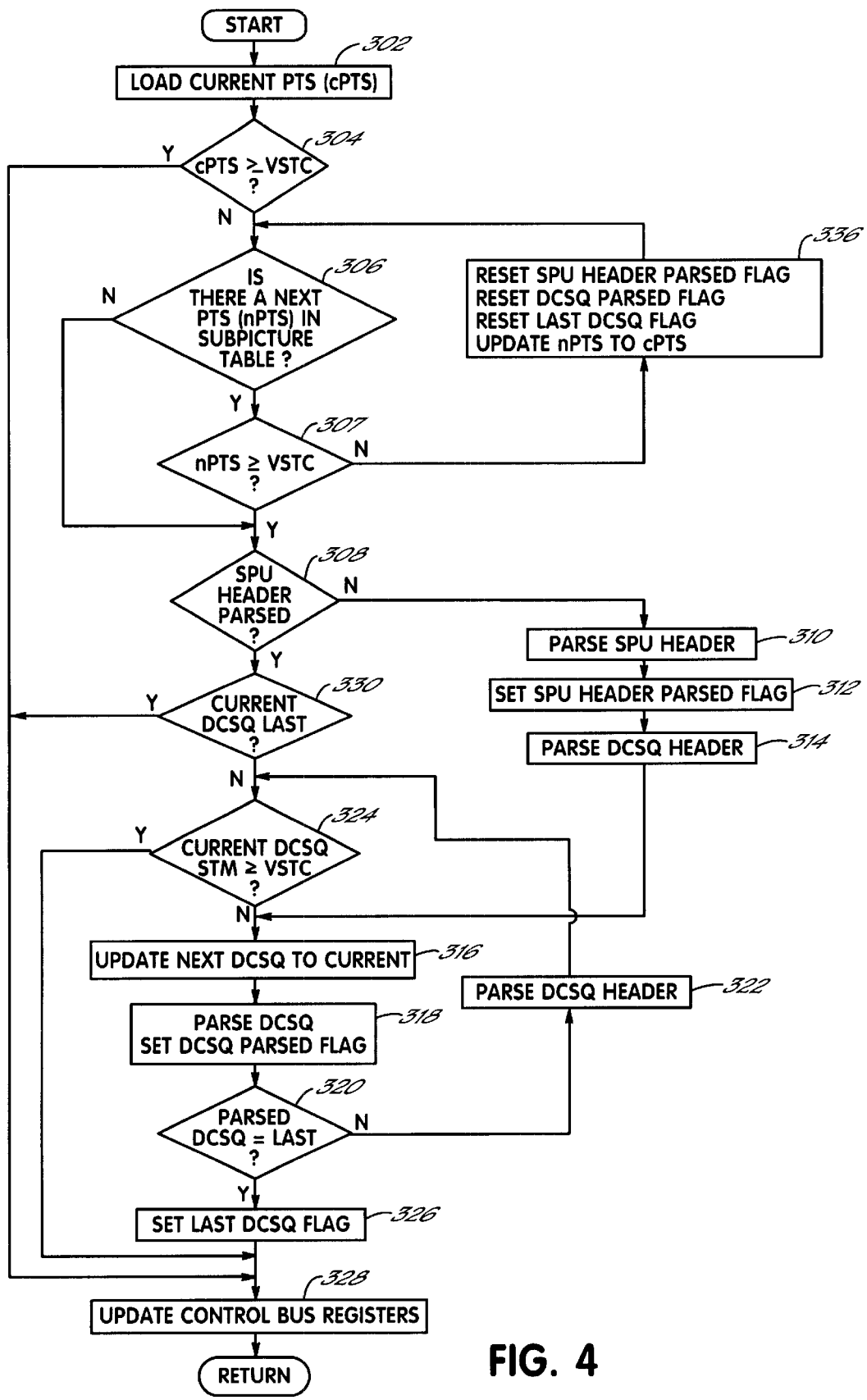
FIG. 4 is a flow chart illustrating the steps in a subpicture master control subroutine in accordance with the principles of the present invention.
Figure 5:
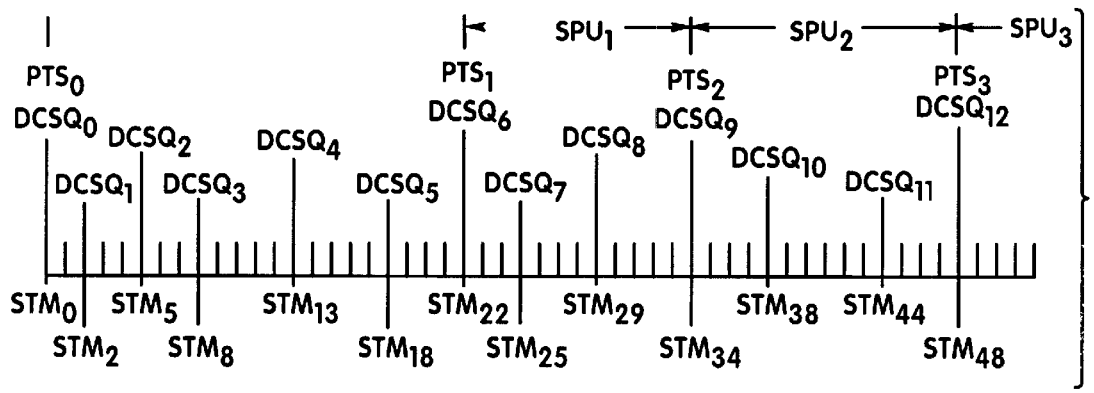
FIG. 5 is a timing diagram of successive subpicture units and display control sequence commands arranged in accordance with respective start times.
Figure 6A:
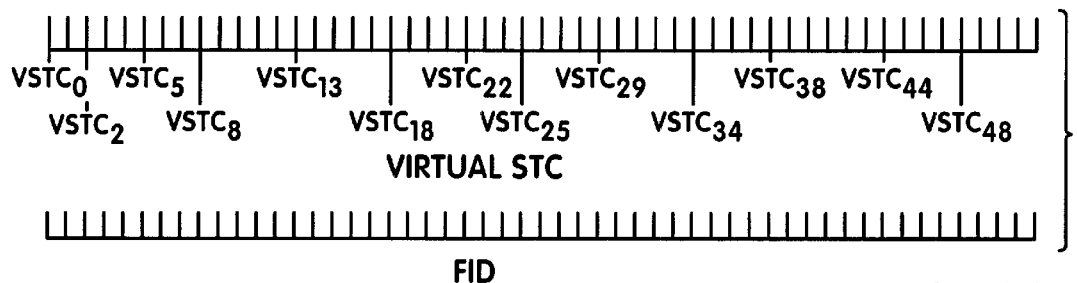
FIG. 6A is a timing diagram of the operation of a virtual system time clock as it is incremented in association with each fid in a standard play back mode.
Figure 6B:
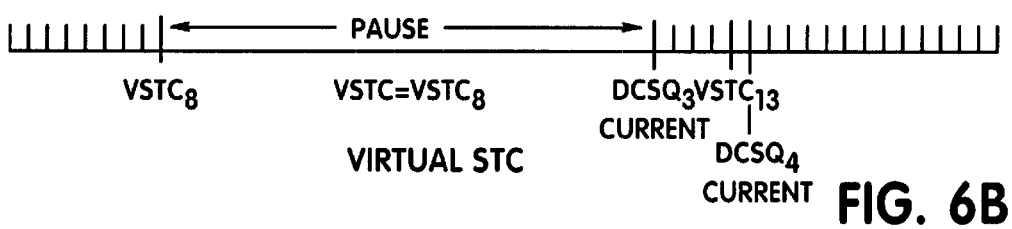
FIG. 6B is a timing diagram illustrating the execution of display control sequence commands based on the subroutine of FIG. 4 and the operation of the virtual system time clock during a pause mode.
Figure 6C:
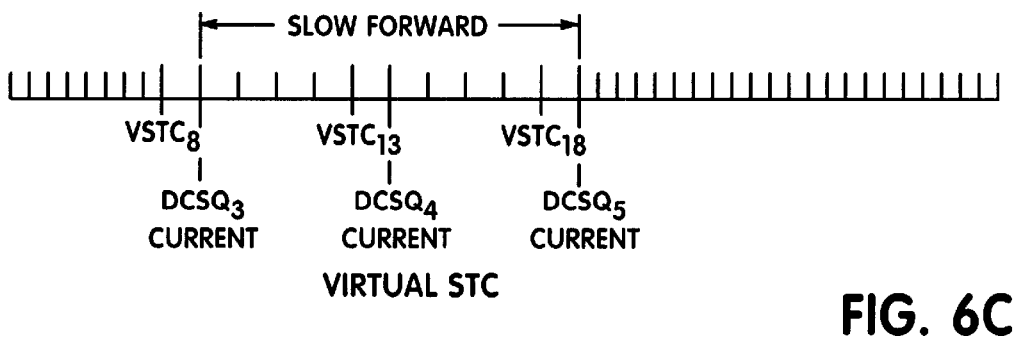
FIG. 6C is a timing diagram illustrating the execution of display control sequence commands based on the subroutine of FIG. 4 and the operation of the virtual system time clock during a slow forward play mode.

FIG. 4 illustrates a subpicture master control subroutine which is executed by the RISC 80 and is capable of handling variations in the playback of the subpicture. The subpicture master control subroutine is executed during each vertical blanking period and is triggered with each vertical sync pulse, that is, with every field identifier ("fid"). FIG. 5 is a timing diagram of successive SPU's and associated DCSQ commands arranged in accordance with their respective start times. FIG. 6A is a timing diagram of the operation of the VSTC 88 as it is incremented by the RISC 80. Below the VSTC time line is an fid time line that is incremented as a function of the raster scanning process of the display monitor. The RISC 80 increments the VSTC with each fid as a function of the current play mode selected by the user. For example, FIG. 6A illustrates the VSTC and fid relationship during a standard playback mode. FIGS. 6B and 6C illustrate the execution of DCSQ commands based on the operation of the VSTC during the pause and slow forward play modes, respectively.

Referring to FIG. 5, the subpicture data is divided into a series of discrete subpicture units ($SPU_0$ $SPU_1$, $SPU_2$, etc.). Certain data packets have a PTS value that defines the start of a corresponding SPU. The header for each SPU includes the size of the subpicture unit, etc. Each SPU may include several DCSQ commands which generally provide global subpicture color and contrast commands, the coordinates of the location and size of the subpicture, etc. In addition, DCSQ command data may also include a Change Color-Contrast ("CHG_COLCON") command which functions to change the color and contrast within the subpicture on a pixel by pixel basis. Each DCSQ command also has an associated STM value which identifies when the DCSQ command should be executed with respect to the VSTC 88.

The operation of the subroutine of FIG. 4 will first be described with respect to a standard playback, that is, the operation in which the video and subpicture are being played in the same manner in which they were recorded. During a vertical sync blanking period, that is, an fid, the RISC 80 first reads the current PTS value, for example, the PTS prior to $PTS_0$, from a scratch memory in DRAM 42 at 302 and at 304, compares the value of the current PTS to the time value of the VSTC, for example, $VSTC_0$. If the value of the current PTS is equal to or greater than the time value of the VSTC, that means that the data associated with this subpicture unit is to be played at a future time. Therefore, no action is to be taken and the subroutine ends after updating the control bus registers at 328. However, if the current PTS is less than the time value of the VSTC, the subroutine at 306 determines whether there is a next PTS. In making that determination, the RISC 80 looks at the read and write pointers of a PTS subpicture table (not shown). If a subsequent PTS value has not been written into the table, the read and write pointers for the table will be located at immediately adjacent locations. If, however, the DMUX 52 has identified another PTS, for example, the $PTS_0$ of the next subpicture unit, the write pointer will have incremented to write that PTS value in the PTS table. Therefore, the read and write pointers are no longer immediately adjacent each other.

If, at step 306, a next PTS, e.g., $PTS_0$ has been demultiplexed and stored and detected, processing continues to step 307. In step 307, the value of the next PTS is compared to the VSTC time value. If, at 307, the value of the next PTS is found to be equal to or greater than the VSTC time value, then processing continues to step 308, where a flag is checked to determine whether the current SPU has been parsed. Assuming this is the case, processing continues to step 330, where a flag is checked to determine whether the current DCSQ of the current SPU is the last DCSQ of the SPU. Assuming this is also the case, the subroutine ends after updating the control bus registers at 328.

During the next fid, the VSTC 88 is incremented, and at 307, the value of the $PTS_0$ is again compared to the VSTC value. Assume that at this point that the VSTC time value is greater than $PTS_0$, the PTS of the next SPU, $SPU_0$. The subroutine at 336 then updates $PTS_0$ to be the current PTS and resets the "SPU Header Parsed" flag, the "DCSQ Parsed" flag and the "Last DCSQ" flag. Processing then returns to step 306, and passes through step 306 and potentially through step 307. Normally, the read pointer is well behind the write pointer in the PTS table, and SPU's are multiplexed in PTS sequential order. Therefore, in normal processing the SPU's are displayed sequentially. However, with the routine of FIG. 4, when a current PTS is ripe for processing, the loop of steps 304, 306, 307, and 336 is effective to increment through the PTS table and look for subsequent PTS values that are less than the system time clock. That will not occur unless the SPU's are being processed in a nonconsecutive but serial or sequential order, for example, the user has provided a command that requires that video frames be skipped. The subroutine detects an SPU that should be played earlier in time than the current SPU.

After identifying the PTS value of the SPU to be processed, the subroutine arrives at 308, where the "SPU Header Parsed" is checked; and it is determined that the header of $SPU_0$ has not been parsed. Thereafter, the $SPU_0$ header is parsed at 310 which provides information necessary for the display of the subpicture unit. The parsing process extracts the size of $SPU_0$ in byte counts and determines the starting address of the first DCSQ command, that is, $DCSQ_0$, with respect to the base address of the SPU. Thereafter, the "SPU Header Parsed" flag is set at 312; and at 314, the header of the $DCSQ_0$ command is parsed. In that process, the starting address of the following DCSQ command, that is, $DCSQ_1$ is also determined. The process bypasses step 324 because it is assumed that the STM of the first DCSQ in an SPU is the same as the PTS of that SPU. However, after parsing the header at 314, the process could check the value of the STM with respect to the VSTC in step 324. At 316, the next DCSQ command of $SPU_0$, $DCSQ_1$, is set to be identified as the current DCSQ command so that the next DCSQ command can be immediately parsed and processed at the appropriate time. At 318, the $DCSQ_0$ command is parsed. In that process, pixel control data information, for example, color and contrast commands and associated pixel data are transferred to the subpicture processor 62 (FIG. 2) for subsequent display. Thereafter, control is returned to the subroutine of FIG. 4. Next, at 318, the "DCSQ Command Parsed" flag is set; and at 320, a determination is made whether the parsed DCSQ command, $DCSQ_0$, is the last command in the current SPU.

Normally, an SPU will have several data packets that contain respective DCSQ commands; and therefore, the first command to be processed is not the last. More specifically, the subroutine compares the starting address of the DCSQ command parsed in step 318 to the starting address of any subsequent DCSQ command (which command was set as the "current" DCSQ command in step 316). If the starting address of the current command $DCSQ_1$ is not the same as the starting address of the previously parsed DCSQ command $DCSQ_0$, then the parsed command $DCSQ_0$ is not the last command in the SPU. In this instance, the header of the current DCSQ command, $DCSQ_1$ is then parsed at 322. This facilitates immediate parsing of $DCSQ_1$ at the appropriate time. Thereafter, at 324, the starting time STM value of the current DCSQ command, $DCSQ_1$ is compared to the VSTC time value. If the value of the starting time is greater than or equal to the VSTC time value, the current DCSQ command is to be executed in the future, and the subroutine ends after updating the control bus registers at 328. However, if the start time of the current command is less than the time value of the VSTC, the subroutine at 316 then identifies the next command $DCSQ_2$ to be the current DCSQ command. Thereafter, at 318, the command $DCSQ_1$ is parsed and a "DCSQ Parsed" flag is set. Parsing the $DCSQ_1$ command provides information to the subpicture processor to display data represented by the $DCSQ_1$ command. The loop comprised of process steps 320, 322, 324, 316, and 318 continues until all of the DCSQ commands having an STM value earlier than the current VSTC have been processed with the most recently processed command data being sent to the subpicture processor 62 for display during the next picture scan. Therefore, the most current subpicture command information is being displayed in synchronization with the main video. Further, because all of the prior DCSQ commands were parsed, the current display reflects command data that was contained in parsed but undisplayed DCSQ commands and is not only synchronized but is an accurate display. Subsequent executions of the master control subroutine of FIG. 4, during subsequent vertical blanking intervals, will eventually cause all of the DCSQ commands of the current SPU, $SPU_0$, to be processed. When the last DCSQ command, for example, $DCSQ_5$, is detected at 320, the last DCSQ flag is set at 326; and after updating the control bus registers at 328, the subroutine ends.

With each fid, the subroutine of FIG. 4 is executed; and without any trick play commands, as illustrated in FIG. 6A, the SPU's and the DCSQ commands within an SPU will be consecutively executed. Thereafter, at 328, all relevant information regarding the subpicture that was created during the execution of the subroutine of FIG. 4 is then transferred from temporary buffers to the control bus registers. The control bus registers are effective to provide that information to other components within the audio/video decoder 30. The subroutine of FIG. 4 then iterates as previously described, processing the DCSQ commands with each fid.

The VSTC 88 provides a system clock representing a desired playback speed selected by the user, and the subroutine of FIG. 4 has the advantage of being able to consecutively test during an fid all of the demultiplexed SPU's and select the SPU that has a PTS value corresponding to the current state of the VSTC. The subroutine of FIG. 4 further has the ability to consecutively test the DCSQ commands in the selected SPU and select the DCSQ command having an STM that most closely corresponds to the current state of the VSTC. Thus, during the trick play mode selected by the user, the subpicture is displayed in synchronization with the main video. Thus, the subroutine of FIG. 4 has the ability to correctly process consecutively occurring subpicture units and depending on the playback speed being selected by the user, select a nonconsecutive sequence of SPU data for display. Similarly, the subroutine of FIG. 4 processes consecutively occurring DCSQ commands within a selected SPU and depending of the playback speed being selected by the user, selects a nonconsecutive sequence of DCSQ commands for display.

Referring to FIG. 6B, assume that during $SPU_0$, the commands $DCSQ_0$–$DCSQ_2$ are processed by the routine of FIG. 4 in a standard playback mode in which the VSTC 88 increments one video frame with each fid. Assume further that the user activates the pause mode when the VSTC has the time value $VSTC_8$. The RISC 80 freezes the time value of the VSTC 88 at $VSTC_8$ for the duration of the pause mode. Consequently, during pause, the video is frozen at its current display; and it is also desirable that the subpicture playback be frozen at its current display.

This goal is achieved by the routine of FIG. 4. Note that during the pause mode, at each invocation of the subroutine of FIG. 4 at 324, the start time $STM_8$ associated with $DCSQ_3$ is compared to the time value of $VSTC_8$. In the current example, the value of the $STM_8$ is equal to the time value of $VSTC_8$; and the process of the subroutine of FIG. 4 ends after updating the control bus registers at 328. While the system is held in the pause mode, with each successive fid, the VSTC does not change value, and the $DCSQ_3$ command is not executed. When the user terminates the pause mode at a later time, during the next fid, the VSTC is incremented and the subroutine of FIG. 4 at 324 determines that the value of $DCSQ_3$ is less than the time value of the VSTC. At that point, the $DCSQ_4$ command is made the current command (step 316) and the subpicture defined by the parsed $DCSQ_3$ command is displayed (step 318). The system then proceeds in the standard mode with the $DCSQ_4$ command being displayed during the fid after $VSTC_{13}$.

FIG. 6C illustrates another example of how the subroutine of FIG. 4 follows the VSTC time values to accommodate another trick play mode commanded by the user. Assume that the user selects the slow forward mode such that the RISC 80 increments the VSTC once for every two fid's. Assume further, as in the prior example, that the system is operating in the standard play mode during $SPU_0$ through commands $DCSQ_0$–$DCSQ_2$, and that the slow forward mode is commanded when the VSTC has the value $VSTC_8$. The subroutine of FIG. 4 at 324 determines that the value of the $STM_8$ associated with $DCSQ_3$ is equal to the time value of $VSTC_8$. During a subsequent fid and iteration through the subroutine of FIG. 4, the $STM_8$ value will be detected to be less than the $VSTC_8$ time value, and the subpicture defined by the $DCSQ_3$ command is displayed. Thereafter, after 10 subsequent fid's and passes through the routine at FIG. 4, the VSTC will increment 5 times, and the process of FIG. 4 will then create a subpicture display based on the $DCSQ_4$ commands. This process continues, producing subpicture displays at a speed that is one-half the speed of the standard playback.

As will be appreciated, the implementation of the present invention requires that the subpicture units be demultiplexed by the DMUX 52 and not disabled as is the known practice. Further, although not described in detail, the present invention has the capability of processing subpicture in a fast forward mode. In some fast forward modes, the video object unit ("VOBU") is cut or truncated to show only the first picture; however, to implement the present invention with a fast forward mode, even though only the first picture from the VOBU is played back, all of the VOBU must be multiplexed in order to have all of the subpicture data.

In another trick play mode, the user may jump forward a substantial period in the program, for example, to a VSTC time value associated with a much later PTS value, e.g., $PTS_{333}$ which is not illustrated in any drawing. In such a situation, the next SPU stored by the multiplexer will have a much later PTS value, e.g., $PTS_{333}$. The next entry in the PTS subpicture table will as a result be written with the value $PTS_{333}$. Subsequently, the subroutine of FIG. 4, will, at 306, detect the PTS value $PTS_{333}$ and process DCSQ commands associated therewith as previously described.

The subroutine of FIG. 4 has the further advantage in that even though some DCSQ commands may not be displayed, those DCSQ commands are still multiplexed and parsed. The results of parsing the DCSQ command headers are sent to the control registers so that system has the cumulative effect of all prior DCSQ commands when a later subpicture from a subsequent DCSQ command is displayed. Thus, the playback of the later subpicture will be more complete in itself as well as being coordinated with the playback of corresponding video.

While the invention has been illustrated by the description of a preferred embodiment and while the embodiment has been described in considerable detail, there is no intention to restrict nor in any way limit the scope of the amended claims to such detail. Additional advantages and modifications will readily appear to those who are skilled in the art. For example, the SPU's and DCSQ commands are made active in response to the values of their respective PTS's and STM's being less than the time value of the VSTC. As will be appreciated, action can be taken on the SPU's and DCSQ's in response to other relationships to the VSTC, for example, when the values of the respective PTS's and STM's are less than or equal to the time value of the VSTC. In playing back the subpicture, generally, it is not particularly important that a subpicture be precisely identified with a particular frame of video. Therefore, there is a certain latitude in choosing exactly when to play back the subpicture. For ease of implementation, it is more important, that whatever comparison to the VSTC is used, that it be used for all such comparisons.

Therefore, the invention in its broadest aspects is not limited to the specific details shown and described. Consequently, departures may be made from the details described herein without departing from the spirit and scope of the claims which follow.

What is claimed is:

1. A method of operating a digital video processor including a CPU and a memory to control the presentation of demultiplexed subpicture data, the subpicture data comprising a serial stream of subpicture units ("SPU's"), each of the SPU's including in part a plurality of display control sequence ("DCSQ") commands and associated start time values, a start of each of the SPU's being defined by a presentation time stamp ("PTS") associated therewith, the play back of the subpicture being synchronized with a system clock having a clock rate varying as a function of a desired play back speed selected by a user, the method comprising:
   testing during a vertical blanking period, consecutive ones of the SPU's to identify a first SPU including a PTS value having a desired relationship with respect to a value of the system clock;
   testing during the vertical blanking period, consecutive ones of the DCSQ commands in the first SPU to identify one or more DCSQ commands with respective start time values having the desired relationship with respect to the value of the system clock; and
   parsing during the vertical blanking period, the one or more DCSQ commands associated with the first SPU in response to their respective start time values having the desired relationship with respect to the value of the system clock, thereby commanding a play back of the subpicture defined by the first SPU.

2. A method of claim 1 further comprising skipping consecutive ones of the SPU's with PTS values that do not have the desired relationship with respect to the value of the system clock.

3. A method of claim 1 further comprising displaying after the vertical blanking period, subpicture data associated with a last one of the DCSQ commands parsed.

4. A method of claim 1 further comprising selecting the first SPU in response to the PTS of the first SPU being less than the value of the system clock.

5. A method of claim 1 further comprising selecting the first SPU in response to the PTS of the first SPU being less than or equal to the value of the system clock.

6. A method of claim 1 further comprising selecting the first DCSQ command in response to the start time of the first DCSQ command being less than the value of the system clock.

7. A method of claim 1 further comprising selecting the first DCSQ command in response to the start time of the first DCSQ command being less than or equal to the value of the system clock.

8. A method of operating a digital video processor including a CPU and a memory to control the presentation of demultiplexed subpicture data, the subpicture data comprising a serial stream of subpicture units ("SPU's"), each of the SPU's including in part a plurality of display control sequence ("DCSQ") commands and associated start times, a start of each of the SPU's being defined by a presentation time stamp ("PTS") associated therewith, the play back of the subpicture being synchronized with a system clock having a clock rate varying as a function of a desired play back speed selected by a user, the method comprising:

identifying during a vertical blanking period a first SPU having a first PTS value;

identifying in response to identifying the first SPU, a second SPU having a PTS value less than the value of the system clock; and thereafter during the vertical blanking period, parsing DCSQ commands associated with the second SPU in response to start times of respective DCSQ commands being less than the value of the system clock, thereby commanding a play back of the subpicture defined by the second SPU.

9. The method of claim 8 further comprising during the vertical blanking period parsing DCSQ commands associated with the second SPU in response to start times of respective DCSQ commands being less than or equal to the value of the system clock.

10. The method of claim 8 further comprising:

comparing during the vertical blanking period, the first PTS value of the first SPU to the value of the system clock;

comparing during the vertical blanking period, a second PTS value of the second SPU to the value of the system clock in response to the first PTS value being less than the value of the system clock;

parsing during the vertical blanking period, DCSQ commands associated with the first SPU in response to the second PTS value being greater than the value of the system clock; and parsing during the vertical blanking period, DCSQ commands associated with the second SPU in response to the second PTS value being less than the value of system clock.

11. The method of claim 10 further comprising commanding during the vertical blanking period, a display of the first SPU in response to the second PTS value being greater than or equal to the value of the system clock.

12. The method of claim 8 further comprising:

comparing during the vertical blanking period, the first PTS value of the first SPU to the value of the system clock;

comparing during the vertical blanking period, the second PTS value associated with the second SPU to the value of the system clock in response to the first PTS value being less than or equal to the value of the system clock;

parsing during the vertical blanking period, DCSQ commands associated with the first SPU in response to the second PTS value being greater than the value of the system clock; and parsing during the vertical blanking period, DCSQ commands associated with the second SPU in response to the second PTS value being less than the value of system clock.

13. The method of claim 12 further comprising commanding during the vertical blanking period, a display of the second SPU in response to the second PTS value being less than or equal to the value of system clock.

14. The method of claim 8 further comprising detecting during the vertical blanking period, DCSQ commands associated with the second SPU;

comparing during the vertical blanking period, start time values of respective DCSQ commands to the value of the system clock; and parsing during the vertical blanking period, each DCSQ command having a start time value less than the value of the system clock.

15. The method of claim 8 further comprising detecting during the vertical blanking period, DCSQ commands associated with the second SPU;

comparing during the vertical blanking period, start time values of respective DCSQ commands to the value of the system clock; and parsing during the blanking period, each DCSQ command having a start time value less than or equal to the value of the system clock.

16. A method of operating a digital video decoder including a CPU and memory to control the presentation of demultiplexed subpicture data, the subpicture data comprising a serial stream of subpicture units ("SPU's"), each of the SPU's including in part a plurality of display control sequence ("DCSQ") commands and associated start times, a start of each of the SPU's being defined by a presentation time stamp ("PTS") associated therewith, the play back of the subpicture being synchronized with a system time clock having a clock rate varying as a function of a desired play back speed selected by a user, the method comprising:

comparing during a vertical blanking period, a first PTS value for a first SPU to a value of the system time clock;

comparing during the vertical blanking period, a second PTS value associated with a second SPU to the value of the system time clock in response to the value of the first PTS being less than the value of the system time clock;

selecting during the vertical blanking period, the first SPU as a current SPU in response to the second PTS value being greater than or equal to the value of system time clock;

selecting during the vertical blanking period, the second SPU as the current SPU in response to the second PTS value being less than the value of system time clock;

detecting during the vertical blanking period, DCSQ commands associated with the current SPU;

comparing during the vertical blanking period, respective start time values of the DCSQ commands to the value of the system time clock; and parsing during the vertical blanking period, one or more DCSQ commands in response to the value of the start time of each of the DCSQ commands being less than or equal to the value of the system time clock; and displaying after the vertical blanking period, subpicture data associated with one of the one or more of the DCSQ commands.

17. The method of claim 16 further comprising:

comparing in order during the vertical blanking period, respective start time values of the DCSQ commands to the value of the system time clock; and displaying after the vertical blanking period, subpicture data associated with a most recently parsed of the one or more of the DCSQ commands.

18. The method of claim 17 further comprising comparing in consecutive order during the vertical blanking period, respective start time values of the DCSQ commands to the value of the system time clock.

* * * * *